July 16, 1968     M. H. ANDERSON     3,392,842

SELF-CLEANING COUNTER-FLOW STRAINER ASSEMBLY

Filed July 28, 1966

INVENTOR
MARVIN H. ANDERSON

BY *Olsen and Stephenson*
ATTORNEYS

United States Patent Office 3,392,842
Patented July 16, 1968

3,392,842
SELF-CLEANING COUNTER-FLOW
STRAINER ASSEMBLY
Marvin H. Anderson, Vermilion, Ohio, assignor to Amcodyne and Company, Lorain, Ohio, a partnership
Filed July 28, 1966, Ser. No. 568,646
6 Claims. (Cl. 210—411)

ABSTRACT OF THE DISCLOSURE

A strainer assembly for sewage systems in which a plurality of strainer rods are arranged in a spaced apart frusto-conical formation so as to collect solid particles in the sewage around the outer side thereof, and a body disposed coaxially within one end of the strainer rod formation for increasing the velocity of reverse flow flushing fluid during back flushing of the strainer assembly.

This invention relates generally to strainers adapted for use in connection with the sewage inflow to a wet well and more particularly to an improved strainer assembly constructed so as to provide for an increased effective area of the self-cleaning counter-flow strainer without impeding the necessary flow of fluid through the strainer, and to insure cleaning of the strainer during back flushing.

Sewage strainers of the type to which this invention relates are illustrated in U.S. Patents 3,063,566, 3,074,557, and 3,074,558. The strainers illustrated in these patents are constructed so as to retain the sewage solids in a central area of the conduit during the inflow cycle. Liquid in the sewage must travel outwardly around the retained solids in order to pass through the conduit. When the liquid level in the wet well reaches a predetermined level, a pump reverses the flow of liquid through the conduit, so that the liquid is pumped through the strainer and carries all the solids accumulated therein, along with the liquid discharge, in a reverse direction through the conduit. It is desirable to increase the effective area of the strainer in strainers of this type since this insures against the solids impeding the flow of liquid through the strainer. It is also desirable to insure a thorough cleaning of the strainer during back flushing since this also affects the capacity of the strainer and insures against subsequent clogging. It is an object of this invention, therefore, to provide an improved strainer assembly in which the strainer retains the sewage solids in an annular area of the strainer housing extending about the strainer axis so that the flow of the fluid is axially of the housing, and in which the velocity of the back flush fluid is increased in this annular area.

In the improved strainer of this invention, the strainer rods are arranged in a frusto-conical formation adjacent the outlet end of the strainer housing.

Some of the strainer rods are of an increased length and extend toward the inlet end of the housing from the smaller end of the frusto-conical formation. A smaller number of rods can be used in this portion of the strainer since the rods are arranged in a smaller formation. This arrangement increases the effective area of the strainer, without increasing the size of the housing, and provides for an unimpeded flow of liquid sewage axially through the strainer. During back flushing, the flushing fluid must flow between the strainer rods and the inner wall of the housing. To increase the velocity of fluid in this area, and insure complete removal of solid sewage, a body is positioned within the frusto-conical rod formation so as to increase the velocity of the flushing fluid in the vicinity of the solid sewage.

Figure 1:
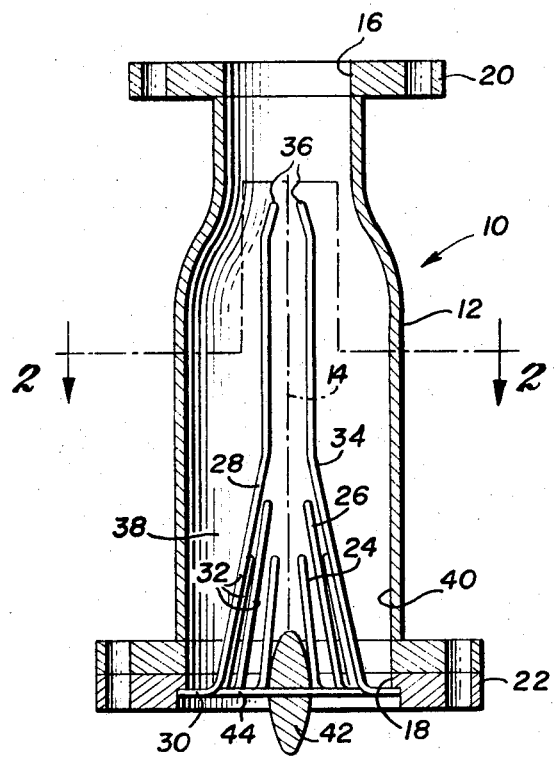
Figure 2:
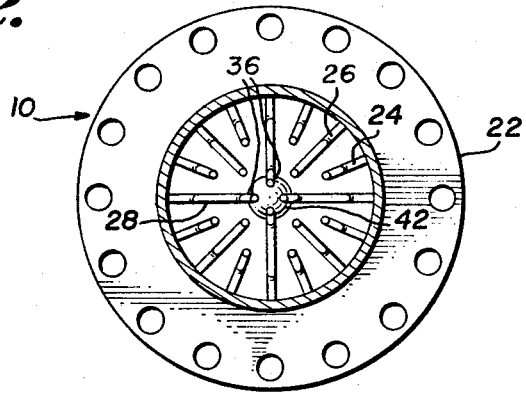

Further objects, features and advantages of this invention will become apparent from the following description, when taken in connection with the appended claims and the accompanying drawing in which:

FIG. 1 is a longitudinal sectional view of the improved strainer assembly of this invention; and FIG. 2 is a transverse sectional view of the strainer assembly of this invention as seen from substantially the line 2—2 in FIG. 1.

With reference to the drawing, the improved strainer assembly of this invention indicated generally at 10, is illustrated in FIG. 1 as including an elongated tubular housing 12 having a longitudinal axis 14, an open end 16 which is hereinafter referred to as the inlet end because sewage to be strained enters the housing through the end 16, and an opposite or outlet end 18. An outwardly extending annular flange 20 at the inlet end 16 and a similar flange 22 at the outlet opening 18 facilitates attachment of the housing 12 as a conduit section to other conduit sections in the sewage treatment system in which the assembly 10 is mounted.

A plurality of strainer rods 24, 26 and 28 of different lengths are arranged within the housing 12 adjacent to the outlet end 18. Each of the rods 24, 26 and 28 has a lower end portion 30 secured to the flange 22 and extending radially inwardly thereof. From the inner end of the portion 30, each of the rods 24, 26 and 28 is provided with an inclined portion 32 which extends radially inwardly of the housing 12 toward the inlet end 16 thereof. The shorter rods 24 maintain a somewhat uniform rod spacing. The rod portions 32 are arranged in a frusto-conical formation within the housing 12 with the rods 26 extending upwardly beyond the rods 24 and the rods 28 having their portions 32 extending above the portions 32 of the rods 26. The upper end 34 of the frusto-conical rod formation is substantially concentric with the housing axis 14 and spaced therefrom for axial passage of liquid sewage. The rods 28 extend upwardly from the frusto-conical rod formation upper end 34 in a substantially parallel relation with the housing axis 14 and terminate at their upper ends 36 in a closely spaced relation spaced from the axis 14.

During the inflow cycle, liquid sewage carrying various solids with it, such as rags and various paper products, enters the inlet end 16 of the housing 12 and is directed into the annular space 38 between the housing inner wall 40 and the frusto-conical strainer rod formation by the upper ends of the long rods 28. The liquid in the sewage flows between the rods 24, 26 and 28 as long as this is possible, and axially within the rod formation through the conduit outlet end 18. The solid sewage is intercepted by the strainer rods and builds up from the rod portions 30 between the rods and the housing inner wall 40. However, these solids never impede the flow of fluid axially within the housing 12 through the frusto-conical rod formation. The liquids thus flow directly through the housing 12 and axially through the accumulated solids.

The inflow cycle is regulated so as to terminate before the solids reach a level above the upper ends 36 of the rods 28. As soon as the inflow cycle stops, a pump reverses the flow of liquid and pumps it back through the housing 12 in reverse direction so that it flows out of the inlet end 16 of the housing. During this back flow cycle, it is important that the flow of fluid through the annular portion 38 of the housing 12 which is occupied by the solids be at as high a velocity as possible so as to dislodge the solid sewage and flush it out the inlet end 16 of the housing 12.

To insure this high velocity of back flush fluid flow, a torpedo shaped body 42 is mounted on one or more rods 44 extended diametrically therethrough and extended diametrically of the housing 12 and secured to a pair of the strainer rods 24, 26 or 28, as shown in FIG. 1. The body 42 is generally round in cross section and is of an increasing diameter from its ends toward its center. The body 42 acts to direct the back flush fluid toward the housing inner wall 40 and to provide the desired high velocity flow because of the restricted path along which the fluid must flow around the body 42. As a result, the velocity of the fluid flowing along the housing inner wall 40 and through the annular space 38 occupied by solid sewage is increased to positively insure the desired back flushing.

It can thus be seen that in the strainer assembly 10 of this invention, the effective area of the strainer is increased because of the increased length of the rods 28, and the provision for flow of liquid axially through the strainer instead of around the strainer. The body 42 for increasing back flush fluid velocity cooperates with the particular rod formation of the strainer of this invention to insure that the normally slow moving fluid adjacent the inner wall 40 of the housing 12 will flow at a high enough velocity to dislodge accumulated sewage solids.

It will be understood that the self-cleaning counter-flow strainer assembly which is herein disclosed and described is presented for purposes of explanation and illustration and is not intended to indicate limits of this invention, the scope of which is defined by the following claims.

What is claimed is:

1. A strainer assembly comprising a hollow housing having an imperforate inner wall, inlet and outlet ends and an axis extending through said ends, a plurality of rods in said housing emanating from said inner wall and disposed adjacent said outlet end in a substantially concentric relation about said axis, said rods being arranged in a spaced relation in a direction extending about said axis and having portions thereof inclined inwardly toward said axis in a direction from said outlet end toward said inlet end whereby at least portions of said rods are arranged in a frusto-conical formation adjacent said housing outlet end, some of said rods being of an increased length relative to others of said rods and being extended from the smaller end of said formation toward said inlet end in a substantially parallel spaced relation with said axis and terminating in a closely spaced relation spaced from said axis, said rods being spaced in sufficiently close relationship to intercept solids carried by liquid flowing through said housing from the inlet to the outlet end thereof and retain said solids in said housing in a position between said strainer rods and said housing inner wall and spaced from said axis so that liquid can flow axially through said strainer.

2. A strainer assembly according to claim 1 further including means adjacent said outlet end for increasing the velocity of reverse flow flushing fluid in said housing flowing between said strainer rods and said housing inner wall.

3. A strainer assembly according to claim 2 in which said means comprises a body disposed in a spaced relation with said strainer rods and in a substantially coaxial relation with said frusto-conical formation, said body having at least a portion thereof upstream from said formation with respect to said reverse flow flushing fluid.

4. A strainer assembly according to claim 3 in which said body has a longitudinal axis disposed substantially on said housing axis and is substantially round in cross section, said body being of decreasing diameter in directions along said axis from the center toward the ends thereof.

5. A strainer assembly according to claim 4 in which said body extends axially within said frusto-conical rod formation.

6. A strainer assembly comprising a hollow housing having an imperforate inner wall, inlet and outlet ends and an axis extending through said ends, a plurality of rods mounted on said housing adjacent said outlet end so that said rods extend radially inwardly of said housing from said inner wall, said rods being arranged in a spaced relation in a direction extending about said axis and having portions thereof inclined inwardly toward said axis and said inlet end so that at least portions of said rods are arranged in a frusto-conical formation adjacent said outlet end and extending toward said inlet end, said rods being spaced in sufficiently close relationship to intercept solids carried by liquid flowing through said housing from the inlet to the outlet end thereof and retain said solids in said housing in a position between said strainer rods and said housing inner wall and spaced from said axis so that liquid can flow axially through said strainer, and a body disposed so that it extends axially within said frusto-conical rod formation in a spaced relation with the rods in said formation, said body being shaped so as to increase the velocity of reverse flow flushing fluid in said housing flowing between said strainer rods and said housing inner wall.

References Cited
UNITED STATES PATENTS

| | | | |
|---|---|---|---|
| 2,278,178 | 3/1942 | Lannert | 210—448 |
| 3,074,557 | 1/1963 | Hanley | 210—446 X |
| 3,278,035 | 10/1066 | Soegaard | 210—316 X |

REUBEN FRIEDMAN, *Primary Examiner.*

F. SPEAR, *Assistant Examiner.*